United States Patent [19]
Beer et al.

[11] Patent Number: 6,037,381
[45] Date of Patent: Mar. 14, 2000

[54] PREPARATION OF POLYTETRAHYDROFURAN WITH TERMINAL HYDROXYL GROUPS USING ION EXCHANGERS

[75] Inventors: Wulfrich Friedemann Beer, Frankenthal; Klaus Beiser, Eppelsheim; Jürgen Ciprian, Ludwigshafen; Lothar Franz, Mutterstadt; Wolfgang Franzischka, Frankenthal; Christof Palm, Ludwigshafen; Frank-Friedrich Pape, Kleinniedesheim; Axel Paul, Lampertheim; Ulrich-Dieter Pessel, Heidelberg; Alexander Weck, Bühlertal, all of Germany

[73] Assignee: BASF Aktiengesellschaft, Ludwigshafen, Germany

[21] Appl. No.: 09/220,776

[22] Filed: Dec. 28, 1998

[30] Foreign Application Priority Data

Dec. 31, 1997 [DE] Germany .............. 197 58 296

[51] Int. Cl.$^7$ .................. C08J 5/20; C08F 6/08
[52] U.S. Cl. .............. 521/28; 521/26; 528/403; 528/482; 528/495

[58] Field of Search ............ 521/26, 28; 528/403, 528/495, 482

[56] References Cited

U.S. PATENT DOCUMENTS 4,985,551  1/1991  Perry et al. .............. 536/18.6
5,410,093  4/1995  Dorai ...................... 568/621

*Primary Examiner*—Duc Truong
*Attorney, Agent, or Firm*—Keil & Weinkauf

[57] ABSTRACT

The invention relates to a process for preparing hydroxyl-containing polymers, in particular for preparing polytetrahydrofuran with terminal hydroxyl groups, from the corresponding acyloxy-containing polymers by transesterification with alcohols in the presence of a sodium-containing catalyst. In this process the polytetrahydrofuiran solution is passed in the presence of a catalytic amount of water directly through at least one ion exchanger following the transesterification in order to remove the sodium cations.

The novel process makes it possible to remove the sodium cations from the sodium-containing catalyst in an economic manner and with little complexity. The residual sodium content can be reduced to values of less than 0.5 ppm.

7 Claims, No Drawings

PREPARATION OF POLYTETRAHYDROFURAN WITH TERMINAL HYDROXYL GROUPS USING ION EXCHANGERS

The invention relates to a process for preparing hydroxyl-containing polymers, in particular for preparing polytetrahydrofuran with terminal hydroxyl groups, from the corresponding acyloxy-containing polymers by transesterification with alcohols in the presence of a sodium-containing catalyst.

It is known in the prior art to prepare polytetrahydrofuran with terminal hydroxyl groups, referred to hereinafter as PTHF for short, from tetrahydrofuran using cationic catalyst systems. The first step thereof results in a polytetramethylene ether whose end groups are determined by the initiator system and reaction medium. These ends groups in the initially obtained polymer must then be converted into alcohol functionalities. A method which is conventionally used for this is the transesterification, initiated by alkaline catalysts, with lower alcohols. Sodium methoxide is known to be an effective transesterification catalyst. After the transesterification, the sodium originating from the sodium methoxide added as catalyst must be removed again from the PTHF solution.

In the prior art, this takes place by precipitation with phosphoric acid. In this case, less than the stoichiometric amount of 85% strength phosphoric acid is added to the PTHF solution containing $Na^+$ and sodium methoxide after the transesterification. There is formation of sodium (hydrogen) phosphates which are virtually insoluble in methanolic PTHF solution and form colloidal precipitates because of the high (local) supersaturation. A filterable precipitate is obtained only when periods of more than 24 hours have elapsed after the addition of phosphoric acid. This is why the colloidal precipitated product must remain, for elapsed-time reasons, in the PTHF solution through all the process stages following the transesterification.

Even after a period of more than 24 hours has elapsed it is still necessary to carry out a two-stage filtration through extremely fine filters to remove the precipitated product from the PTHF solution. The filters must be changed firequently, which takes place manually and is therefore complicated, and the filter residue must be disposed of. In addition, the sludge deposited in the apparatus must be removed manually at longer time intervals.

U.S. Pat. No. 5,410,093 discloses a process in which the catalyst-containing polyol is mixed with a magnesium salt such as magnesium sulfate or magnesium sulfite. This mixture is then dehydrated and subsequently the catalyst, which is now present in insoluble form, is removed from the polyol which is thus catalyst-free. It is said that use of an excess of magnesium salt ensures that the catalyst is completely removed.

U.S. Pat. No. 4,985,551 has disclosed further prior art in which cation exchangers are employed in order to remove the catalyst used in the polyol preparation. An elaborate process consisting of three steps is disclosed. In this case, firstly a sufficient amount of water is added to the polyol to form an emulsion. To this is added, in the next step, a lower aliphatic alcohol in order to break the emulsion. Then a macroporous cation exchanger follows, from which the purified polyol, alcohol and water can be taken. It is evident from the publication that previous attempts to remove the catalyst using ion exchangers always failed because of the low efficiency of the ion exchangers, since the polyols to be purified must be assumed to have a molecular weight of from 500 to 10,000. In order to reduce the catalyst content of the polyols to at least about 5 ppm, too large an amount of ion exchange resin would have been necessary.

It is an object of the present invention based on this prior art, to provide a process in which the sodium originating from the catalyst can be removed again after the transesterification with minimum effort.

We have found that this object is achieved by a process for preparing hydroxyl-containing polymers, in particular for preparing polytetrahydrofuran with terminal hydroxyl groups, from the corresponding acyloxy-containing polymers by transesterification with alcohols in the presence of a sodium-containing catalyst, by passing the polytetrahydrofuran solution in the presence of a catalytic amount of water directly through at least one ion exchanger following the transesterification in order to remove the sodium cations.

When carrying out the novel process, it has proven sufficient to pass the PTHF solution in the presence of only a catalytic amount of water directly, i.e. without previous operating or treatment steps, through the at least one ion exchanger.

The functional groups on the ion exchange resin which are capable of the exchange and release $H^+$ ions are sulfonic acid groups which are bonded via benzene rings to an organic polymeric matrix. In aqueous media, these groups are virtually completely dissociated, so that $H^+$ ions can easily be replaced by other cations. In contrast to this, the degree of dissociation in methanolic solution is only low. It has been recognized that sodium methoxide must first be hydrolyzed to methanol and sodium ions. The catalytic amount of water provided according to the invention serves for this. It has emerged that the reaction rate is crucially influenced by the water content, and this in turn depends on the degree of dissociation of the sulfonic acid groups and of the sodium hydroxide which is formed from the hydrolysis of sodium methoxide to methanol and sodium hydroxide solution.

In a preferred embodiment of the novel process, a fixed bed ion exchanger is used. This can be a strongly acidic cation exchanger in gel form. However, it is also possible to use a macroporous highly crosslinked resin in the form of a strongly acidic cation exchanger.

A preferred embodiment can additionally entail using at least two ion exchangers arranged in series. In this case, initially only the first ion exchanger is loaded until the $Na^+$ concentration in the polytetrahydrofuran solution after flowing through the ion exchanger has reached a previously determined maximum value. After this maximum value is reached, the outflow from the first ion exchanger is fed into the second ion exchanger until roughly the breakthrough of the ion exchange resin of the first ion exchanger takes place. This procedure has the advantage that the first ion exchanger can be loaded until its capacity limit is reached. This makes the process even more efficient and cost-effective.

The breakthrough of the resin can be identified by a large rise in the conductivity of the solution flowing out of the first ion exchanger. It has proven beneficial to take the first ion exchanger out of operation when the conductivity at the outflow from this ion exchanger has risen to 10% of the conductivity of the inflow.

When the novel process is used, the residual sodium content can be reduced to levels of 1 ppm or less, preferably 0.5 or 0.3 ppm.

After the first ion exchanger has been taken out of operation, the process is continued with the second ion exchanger. This takes the place of the first ion exchanger until the previously determined maximum value is also reached with it. This ion exchanger, which is now the first, is then again connected in series with another ion exchanger in order to ensure that the first ion exchanger can be loaded up to its capacity limit without the previously determined maximum value of the sodium concentration being exceeded in the PTHF solution.

Each of the ion exchangers which have been taken out of operation are subsequently regenerated again using dilute mineral acid and can then be available for the sodium removal process again. This makes it possible to carry out the process quasi-continuously.

When mention is made in general of the preparation of PTHF within the scope of this invention and, in particular, in explaining the novel process, the PTHF embraces all possible PTHF types which are obtainable, for example, as PTHF 650, PTHF 1000 and PTHF 2000, where the number in each case is the average molecular weight. In this connection, it has emerged as a great advantage that the time taken to change the production system over from PTHF with a particular molecular weight to a PTHF with a different molecular weight is very much less than with the previously customary process with phosphoric acid precipitation.

EXAMPLES

Below firstly the fundamental procedure for removing sodium through two ion exchangers in series is described.

1. Removal of Sodium Through Two Ion Exchangers in Series

The first ion exchanger is loaded until the sodium concentration measured in the outflow from the ion exchanger rises to levels $\geq 1$ ppm. Care must be taken during this that sufficient time remains until the previously determined maximum value of 1 ppm is reached to ensure connection of this first ion exchanger in series with a second ion exchanger.

When the previously determined maximum value is reached, the outflow from the first ion exchanger is fed into the second ion exchanger which, at this time, is filled with PTHF of reduced sodium concentration. An increase in the conductivity of the product flowing out of the first ion exchanger indicates that breakthrough of the ion exchange resin is starting. For the purposes of the present process, the first ion exchanger was taken out of operation when the conductivity at the outflow from this ion exchanger had risen to 10% of the conductivity of the inflow. It has emerged that taking out of operation at higher conductivities only negligibly increases the operating capacity.

When the capacity limit of the first ion exchanger is reached in this way, it is detached from the inflow of PTHF solution so that the second ion exchanger downstream now replaces the first ion exchanger. The PTHF still present in the first ion exchanger is displaced with methanol and returned to the inflow buffer of the ion exchanger stage.

When the ion exchanger bed has been washed free of product with methanol, the liquid still retained in the fixed ion exchanger bed is displaced with nitrogen. This liquid contains both PTHF and sodium, which is why it is likewise returned to the inflow buffer. The ion exchanger bed is then filled with distilled water, deaerated and washed free of methanol in order to avoid precipitation of sodium sulfate, which would block the fixed bed and/or the resin supports, during the subsequent regeneration which is carried out with sulfuric acid.

The ion exchange resin is regenerated with dilute mineral acid, for example with dilute sulfuric acid. In practice, a 5% strength dilute sulfuric acid was employed. However, successful regeneration is not confined to the use of 5% strength sulfuric acid or to the use of sulfuric acid as such. Following the regeneration, the resin is washed free of acid with distilled water, and the washing water is displaced with nitrogen in order to introduce as little water as possible into the process. Water remaining in the swollen resin is therefore removed by washing with methanol.

After the ion exchanger has been regenerated in this way, the ion exchanger bed is filled with transesterified PTHF solution from the inflow buffer. Excess PTHF solution and displaced methanol are returned to the inflow buffer. In order to obtain a PTHF solution, which does not exceed the previously determined maximum value, from the outflow from the ion exchanger, the methanol is displaced from the ion exchanger bed. The volumetric flow during this corresponds to the charging of the bed during the loading sequence.

There is laminar flow through the ion exchanger bed both during the loading and during the regeneration.

2. Experimental Design for the Investigations Described Hereinafter

The methanolic, sodium-containing PTHF solution obtained from the transesterification is delivered by a gear pump and a piston meter into a jacketed, temperature-controlled glass column packed with ion exchanger. The glass column in this case has a diameter of 30 mm. The inflow quantity is set at a fixed value and is kept constant by the piston meter⇌gear pump control loop. The PTHF solution flows through the ion exchanger bed with a volumetric flow of about 2100 ml/h, which corresponds to 3.3 bed volume (based on the resin volume) per hour and an empty tube velocity of 3 m/h, and sodium ions are removed during this. The conductivity and the pH of the column outflow are monitored and recorded on line. The column outflow is collected in fractions in order to be able to determine the sodium content and the quality characteristics of the product off line. Continuous operation while maintaining the previously determined maximum value of the sodium concentration of less than 1 ppm is made possible by alternate operation of two identical columns and control of the inflow pump via the conductivity of the column outflow. The washing and regeneration solutions required to regenerate the particular ion exchanger are made available in a separately controllable inflow unit. The charging data for the experimental columns agree with those for the operating column.

Since the conductivity of methanolic PTHF solution is directly proportional to the sodium content over more than three powers of ten, it was regarded as suitable for monitoring and determining the breakthrough of the ion exchange resin. A corrosion-resistant sensor (materials: PTFE/glass/platinum) was used for the measurement, and the respective measurement time was in the ms range.

3. Investigation of Various Ion Exchange Resins and Determination of their Resin Capacity A strongly acidic ion exchanger in gel form, and a macroporous highly crosslinked resin based on polystyrene with sulfonate groups as functional group were investigated. The strongly acidic ion exchange resin in gel form is referred to hereinafter as A and the macroporous highly crosslinked ion exchange resin is referred to as B.

On comparison, resin A shows, because of the lack of crosslinking, a lower strength and is less chemically resistant but has a higher capacity than the more mechanically and chemically resistant resin B which has a high degree of crosslinking.

On repeated loading and regeneration of said resins, the following maximum resin capacities were determined up to the start of the increase in the sodium outflow concentration (corresponds to the 1st breakthrough) and to saturation of the resin (corresponds to the 2nd breakthrough: outflow= inflow concentration) for PTHF 1000:

TABLE 1

| Resin | 1st breakthrough | 2nd breakthrough |
| --- | --- | --- |
| A | 1.7 eq/l resin | 2.2 eq/l resin |
| B | 0.9 eq/l resin | 1.2 eq/l resin |

If the resins are not charged up to the 2nd breakthrough in continuous operation, the following maximum resin capacities result for PTHF 1000:

TABLE 2

| A | 1.4 eq/l resin |
| --- | --- |
| B | 1.24 eq/l resin |

It was possible in principle to utilize about 70–75% of the resin capacity. Resin A showed a decline in capacity which is attributable to its gel-like consistency. Comparative screen analysis of resins A and B before and after continuous use for 50 loading and regeneration cycles additionally showed that resin A was about 50% broken down into fragments, whereas resin B showed no resin fragmentation.

In further experiments, the resin capacities of resin B were determined when the ion exchanger is loaded with PTHF solution with higher molecular weight. These experiments were carried out with PTHF 2000 and resulted in the following maximum resin capacity:

TABLE 3

| B | 1.2 eq/l resin |
| --- | --- |

It follows from this that it was possible to attain virtually identical experimental results, and thus a comparable quality of separation, with the tested resin B for PTHF 2000 which has a higher viscosity than PTHF 1000.

4. Investigations of the Quality of the PTHF After Flowing Through the Ion Exchangers To determine the product quality, the hydroxyl number, pH, ester number, color number and acid number were determined. The hydroxyl number and the ester number remained unchanged. Overall, all the values were within the permissible limits, and the color number was in fact below this. This means that the PTHF was not contaminated with additional coloring components from the particular ion exchange resin and/or the regeneration and washing liquids but was in fact decolorized further.

We claim:

1. A process for preparing hydroxyl-containing polymers, in particular for preparing polytetrahydrofbran with terminal hydroxyl groups, from the corresponding acyloxy-containing polymers by transesterification with alcohols in the presence of a sodium-containing catalyst, by passing the polytetrahydrofuran solution in the presence of a catalytic amount of water directly through at least one ion exchanger following the transesterification in order to remove the sodium cations.

2. A process as claimed in claim 1, wherein a fixed ion exchanger bed is used.

3. A process as claimed in claim 1, wherein a strongly acidic cation exchanger in gel form is used.

4. A process as claimed in claim 1, wherein a macroporous highly crosslinked strongly acidic cation exchanger is used as ion exchanger.

5. A process as claimed in claim 1, wherein at least two ion exchangers in series are used, with initially only the first ion exchanger being loaded until the $Na^+$ concentration of the polytetrahydrofiiran solution reaches a previously determined maximum value after flowing through the ion exchanger, and with the two ion exchangers being used together after the maximum value is reached until roughly the breakthrough of the ion exchange resin of the first ion exchanger.

6. A process as claimed in claim 5, wherein the previously determined maximum value of the $Na^+$ concentration is<1 ppm.

7. A process as claimed in claim 1, wherein the ion exchange resin is regenerated with dilute mineral acid.

* * * * *

UNITED STATES PATENT AND TRADEMARK OFFICE
CERTIFICATE OF CORRECTION

PATENT NO.: 6,037,381

DATED: March 14, 2000

INVENTOR(S): BEER et al.

It is certified that error appears in the above-identified patent and that said Letters Patent is hereby corrected as shown below:

IN THE CLAIMS

Column 6, claim 1, line 14, change "polytetrahydrofbran" to --polytetrahydrofuran--.

Column 6, claim 5, line 32, change "polytetrahydrofiiran" to --polytetrahydrofuran--.

Signed and Sealed this

Twenty-fourth Day of April, 2001

*Attest:*

NICHOLAS P. GODICI

*Attesting Officer*  Acting Director of the United States Patent and Trademark Office